(12) United States Patent
Wang et al.

(10) Patent No.: US 10,878,074 B2
(45) Date of Patent: *Dec. 29, 2020

(54) IDENTITY VERIFICATION METHOD AND SYSTEM, AND INTELLIGENT WEARABLE DEVICE

(71) Applicant: Advanced New Technologies Co., Ltd., George Town (KY)

(72) Inventors: Xiaochen Wang, Hangzhou (CN); Yuanbo Sun, Hangzhou (CN); Fei Meng, Hangzhou (CN); Mian Huang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,701

(22) Filed: Dec. 23, 2019

(65) Prior Publication Data

US 2020/0127822 A1 Apr. 23, 2020

Related U.S. Application Data

(63) Continuation of application No. 16/186,125, filed on Nov. 9, 2018, which is a continuation of application No. PCT/CN2017/079992, filed on Apr. 11, 2017.

(30) Foreign Application Priority Data

May 11, 2016 (CN) .......................... 2016 1 0308911

(51) Int. Cl.
*G06F 21/35* (2013.01)
*H04L 29/06* (2006.01)
(Continued)

(52) U.S. Cl.
CPC ............ *G06F 21/35* (2013.01); *H04L 9/0869* (2013.01); *H04L 9/0877* (2013.01); *H04L 9/32* (2013.01);
(Continued)

(58) Field of Classification Search
CPC ... H04L 9/0877; H04L 9/0869; H04L 9/3297; H04L 9/32; H04L 9/3234; H04L 9/3228;
(Continued)

(56) References Cited

U.S. PATENT DOCUMENTS 10,050,790 B2 * 8/2018 Gawlas ................. H04L 9/3226
10,152,707 B2 * 12/2018 Rogers ................. G06Q 20/327
(Continued)

FOREIGN PATENT DOCUMENTS

CN 103647645 3/2014
CN 104243494 12/2014
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Cheng-Feng Huang
(74) *Attorney, Agent, or Firm* — Fish & Richardson P.C.

(57) ABSTRACT

A request is received from an intelligent terminal by an intelligent wearable device for enabling a one-time password function, and the intelligent wearable device is configured with an embedded algorithm chip. Provisional data from a provisioning server is obtained using the intelligent terminal. The provisional data is verified. If the provisional data is verified, the verified provisional data is stored on the intelligent wearable device. Using a micro operating system, the embedded algorithm chip is invoked to generate a
(Continued)

one-time password, and the one-time password is displayed on a computer display of the intelligent wearable device. The one-time password is configured to permit a verification server to verify the intelligent wearable device.

14 Claims, 5 Drawing Sheets

(51) Int. Cl.
*H04L 9/32* (2006.01)
*H04W 12/06* (2009.01)
*H04W 4/80* (2018.01)
*H04L 9/08* (2006.01)

(52) U.S. Cl.
CPC .......... *H04L 9/3228* (2013.01); *H04L 9/3234* (2013.01); *H04L 9/3297* (2013.01); *H04L 29/06* (2013.01); *H04W 4/80* (2018.02); *H04W 12/0608* (2019.01); *G06F 2221/2103* (2013.01); *G06F 2221/2151* (2013.01); *H04L 2209/12* (2013.01); *H04L 2209/80* (2013.01)

(58) Field of Classification Search
CPC . H04L 29/06; H04L 2209/80; H04L 2209/12; H04L 9/0825; H04L 2209/26; H04L 9/0863; H04L 63/0838; H04W 12/06; H04W 4/80; H04W 12/0608; G06F 21/35; G06F 2221/2151; G06F 2221/2103; G06F 1/163
See application file for complete search history.

(56) References Cited

U.S. PATENT DOCUMENTS

| | | | |
|---|---|---|---|
| 10,534,900 B2* | 1/2020 | Cheong | A61B 5/681 |
| 2010/0138652 A1 | 6/2010 | Sela et al. | |
| 2011/0113245 A1 | 5/2011 | Varadarajan | |
| 2011/0276495 A1 | 11/2011 | Varadarajan et al. | |
| 2013/0133055 A1* | 5/2013 | Ali | H04L 63/107 726/7 |
| 2014/0189831 A1* | 7/2014 | Kemshall | H04L 9/088 726/6 |
| 2015/0172282 A1* | 6/2015 | von Krogh | G06F 21/31 726/6 |
| 2015/0281222 A1* | 10/2015 | Burch | H04L 63/0838 726/6 |
| 2015/0286813 A1* | 10/2015 | Jakobsson | G06F 21/35 726/9 |
| 2015/0295907 A1* | 10/2015 | Abrahamson | H04L 63/065 713/150 |
| 2015/0365235 A1 | 12/2015 | Hostyn et al. | |
| 2015/0381602 A1* | 12/2015 | Grim | H04L 63/08 726/4 |
| 2015/0381633 A1* | 12/2015 | Grim | H04W 12/06 726/4 |
| 2015/0382195 A1* | 12/2015 | Grim | H04L 63/08 726/4 |
| 2016/0299779 A1* | 10/2016 | Kulkarni | H04L 63/0492 |
| 2016/0314453 A1* | 10/2016 | Rogers | G06Q 20/3272 |
| 2016/0321668 A1* | 11/2016 | Choi | G06F 16/22 |
| 2016/0337126 A1* | 11/2016 | Gawlas | G06Q 20/3276 |
| 2017/0011210 A1* | 1/2017 | Cheong | G06F 21/32 |
| 2019/0097796 A1 | 3/2019 | Wang et al. | |

FOREIGN PATENT DOCUMENTS

| | | |
|---|---|---|
| CN | 104601327 | 5/2015 |
| CN | 104780044 | 7/2015 |
| CN | 105023182 | 11/2015 |
| CN | 105052072 | 11/2015 |
| CN | 105429660 | 3/2016 |
| JP | 2002269479 | 9/2002 |
| JP | 2013514587 | 4/2013 |
| JP | 2014109986 | 6/2014 |
| JP | 2016012902 | 1/2016 |
| KR | 20160016515 | 2/2016 |
| TW | 201214188 | 4/2012 |
| TW | 201414328 | 4/2014 |
| TW | 201421390 | 6/2014 |
| WO | WO 2016019127 | 2/2016 |

OTHER PUBLICATIONS

European Extended Search Report in European Application No. 17795365.0, dated Mar. 8, 2019, 9 pages.
International Search Report of the International Searching Authority issued in International Application No. PCT/CN2017/079992 dated Jul. 5, 2017; 8 pages.
Nakamoto, "Bitcoin: A Peer-to-Peer Electronic Cash System," www.bitcoin.org, 2005, 9 pages.
PCT International Preliminary Report on Patentability in International Application No. PCT/CN2017/079992, dated Nov. 13, 2018, 8 pages (with English translation).
Uymatiao, "Time-based OTP authentication via secure tunnel (TOAST): A mobile TOTP scheme using TLS seed exchange and encrypted offline keystore," 2014 4th IEEE International Conference on Information Science and Technology, 2014, pp. 225-229.

\* cited by examiner

IDENTITY VERIFICATION METHOD AND SYSTEM, AND INTELLIGENT WEARABLE DEVICE

CROSS-REFERENCE TO RELATED APPLICATIONS

This application is a continuation of U.S. patent application Ser. No. 16/186,125, filed on Nov. 9, 2018, which is a continuation of PCT Application No. PCT/CN2017/079992, filed on Apr. 11, 2017, which claims priority to Chinese Patent Application No. 201610308911.X, filed on May 11, 2016, and each application is hereby incorporated by reference in its entirety.

TECHNICAL FIELD

The present application relates to the field of intelligent wearable device technologies, and in particular, to an identity verification method and system, and an intelligent wearable device.

BACKGROUND

With the continuous development of offline payment scenarios, the payment method has changed from the traditional cash payment to the current QR scanning payment, sound wave payment, NFC payment, Bluetooth payment, etc. Using intelligent devices instead of cash is bound to become the main payment method in the future. The current offline payment scenarios mainly depend on users' smartphones, and payments are mainly made by using the payment apps on the mobile phones.

As intelligent wearable devices develop, the application of intelligent devices has gradually transformed from only the mobile phone to the Internet of Everything, and everything is becoming intelligent. Using more convenient and friendlier intelligent wearable devices for payments can achieve better payment experience. Identity verification is an important step in the payment process. Using the intelligent wearable devices to implement identity verification in the payment process has bright prospects.

SUMMARY

Implementations of the present application provide an identity verification method and system and an intelligent wearable device, to implement identity verification.

To resolve the previous technical problem, the implementations of the present application are implemented as follows.

An identity verification method, including: obtaining and storing, by an intelligent wearable device configured with an embedded algorithm chip, provisioning data from a provisioning server by using a connected intelligent terminal; invoking, by the intelligent wearable device, the embedded algorithm chip by using a micro operating system, generating and presenting a one-time password based on the provisioning data; obtaining, by a merchant device, the presented one-time password and sending the one-time password to a verification server for verification; and receiving, by the merchant device, a verification success message sent by the verification server to complete identity verification.

An identity verification method, including: obtaining and storing, by an intelligent wearable device configured with an embedded algorithm chip, provisioning data from a provisioning server by using a connected intelligent terminal; and invoking, by the intelligent wearable device, the embedded algorithm chip by using a micro operating system, generating and presenting a one-time password based on the provisioning data.

An identity verification system, including: a provisioning server, configured to store provisioning data; an intelligent wearable device, configured with an embedded algorithm chip, where the intelligent wearable device obtains and stores the provisioning data from the provisioning server by using a connected intelligent terminal; the embedded algorithm chip has a predetermined one-time password generation algorithm, and the intelligent wearable device invokes the embedded algorithm chip and generates and presents a one-time password based on the provisioning data. The identity verification system also includes a merchant device, configured to obtain the presented one-time password and send the one-time password to a verification server for verification, and further configured to complete identity verification when receiving a verification success message sent by the verification server; and the verification server, configured to verify the one-time password sent by the merchant device.

An intelligent wearable device for identity verification, including: a provisioning data acquisition unit, configured to obtain provisioning data from a provisioning server by using a connected intelligent terminal; a storage unit, configured to store the obtained provisioning data; an embedded algorithm chip, which has a predetermined one-time password generation algorithm and generates a one-time password based on the provisioning data; and a presentation unit, configured to present the generated one-time password.

The implementations of the present application can implement identity verification of the intelligent wearable device.

BRIEF DESCRIPTION OF DRAWINGS

To describe the technical solutions in the implementations of the present application or in the existing technologies more clearly, the following briefly describes the accompanying drawings needed for describing the implementations or the existing technologies. Apparently, the accompanying drawings in the following description merely show some implementations of the present application, and a person of ordinary skill in the art can still derive other drawings from these accompanying drawings without creative efforts.

DESCRIPTION OF IMPLEMENTATIONS

Figure 1:
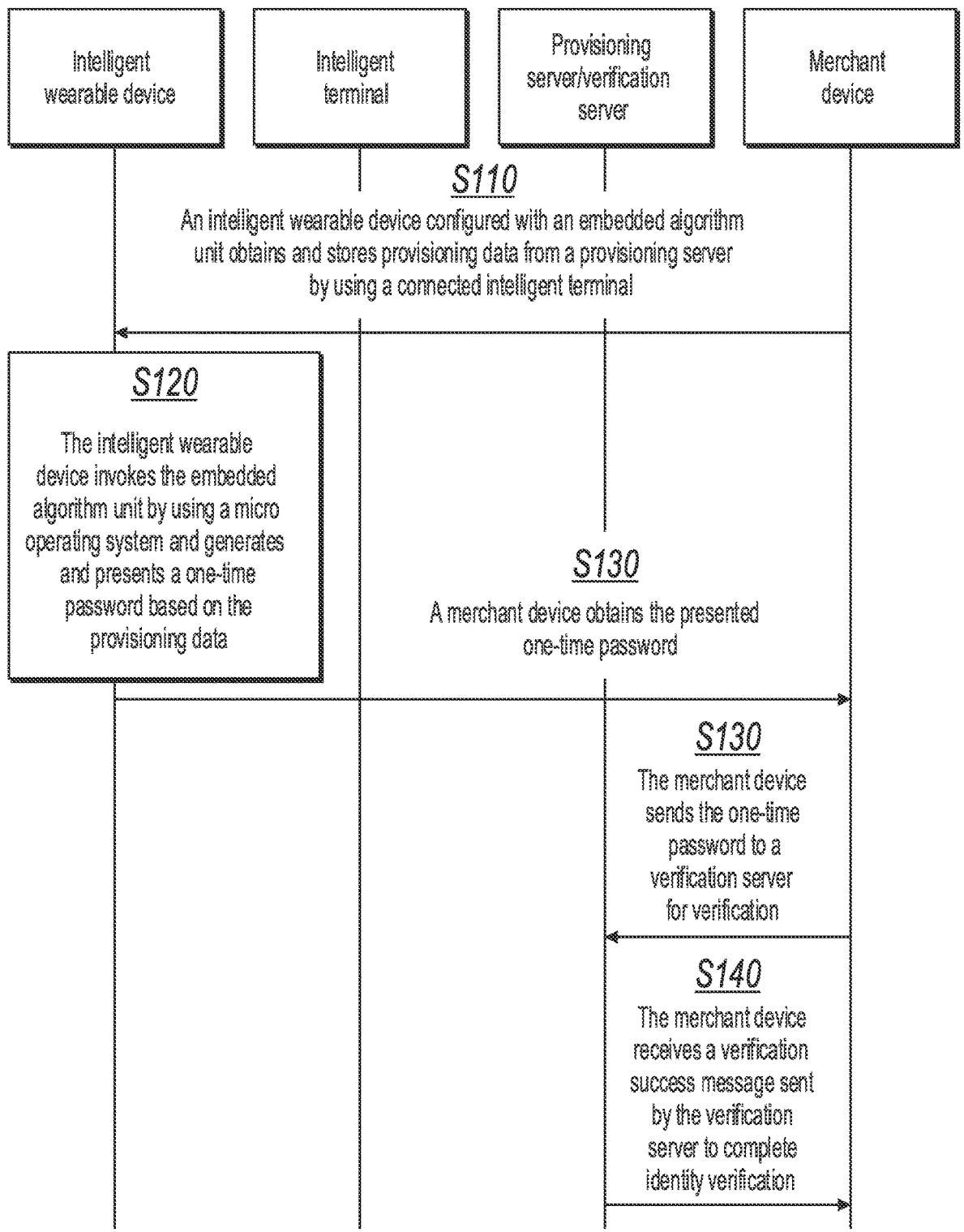
FIG. 1 is a flowchart illustrating an implementation of an identity verification method, according to the present application.

Implementations of the present application provide an identity verification method and system, and an intelligent wearable device.

To make a person skilled in the art understand the technical solutions in the present application better, the following clearly and completely describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

Implementations of the present application provide an identity verification method. The method relates to an intelligent wearable device, a merchant device, and a server. The server can be responsible for provisioning an identity verification service of the intelligent wearable device and identity verification of the intelligent wearable device. Therefore, a provisioning server and a verification server can be disposed. Certainly, the provisioning server and the verification server can be located on the same physical server, which is not limited here. The provisioning server and the verification server can save seed files needed for provisioning and verification. The intelligent wearable device can be installed with an embedded algorithm chip. The embedded algorithm chip can be a small chip, such as an embedded security element (eSE). The embedded algorithm chip can have a predetermined one-time password generation algorithm. The embedded algorithm chip can provide an interface through hardware connection, so the intelligent wearable device can invoke it. The intelligent wearable device can communicate with the embedded algorithm chip, by using a micro operating system, to complete data transmission etc. The intelligent wearable device can provide a presentation unit, configured to present a one-time password to the merchant device. Usually the presentation unit can be, for example, a display screen, so a generated one-time password can be presented on the display screen. The intelligent wearable device can be installed with a short-range wireless communications unit, and the short-range wireless communications unit can perform wireless communication with an intelligent terminal (such as a smartphone or a tablet computer). The short-range wireless communication can include communications technologies such as Bluetooth, infrared (IrDA), wireless local area network (Wi-Fi or WLAN, mostly 802.11 series protocols), Wi-Fi Direct, ultra-wide band, ZigBee, and near field communication (NFC). The merchant device, for example, is a scanning device (including a scanning gun, a vertical scanner, or an embedded scanning module), and can obtain through scanning a one-time password presented on the presentation unit of the intelligent wearable device.

As shown in FIG. 1, an implementation of the present application provides an identity verification method, including:

S110. An intelligent wearable device configured with an embedded algorithm chip, obtains and stores provisioning data from a provisioning server by using a connected intelligent terminal.

The provisioning data can include a seed and a server timestamp.

The intelligent wearable device configured with the embedded algorithm chip can obtain and store the provisioning data directly from the provisioning server by using the intelligent terminal, or the provisioning data can be encrypted and then transmitted to ensure transmission security. The latter can be that the intelligent wearable device configured with the embedded algorithm chip, stores the encrypted provisioning data after receiving it. The encryption mode can use a symmetric encryption technology or an asymmetric encryption technology.

The asymmetric encryption technology is also referred to as public-key cryptography, for example, the classic RSA algorithm. The asymmetric key encryption technology uses a pair of matched keys for encryption and decryption. There are two keys, one is a public key, and the other is a private key. Each key performs unidirectional processing on data, and the function of one key is contrary to that of the other key. When one key is used for encryption, the other one is used for decryption. A file encrypted by the public key can be decrypted only by using the private key, and a file encrypted by the private key can be decrypted only by using the public key. The public key is usually disclosed by its owner, and the private key must be kept secret. To send a confidential packet, a sender can encrypt the data by using a public key of a receiver. Once the data is encrypted, the data can be decrypted by the receiver only by using its private key. On the contrary, a user can also process the data with its own private key. If the sender encrypts the data by using its own private key, the receiver can decrypt the data by using a public key provided by the sender. In addition to the RSA algorithm, the typical asymmetric encryption algorithm includes Elgamal, knapsack algorithm, Rabin, D-H, and Elliptic Curve Cryptography (ECC). Details are not described here.

The solution of S110 using the asymmetric encryption technology is implemented in S111 to S115.

S111. The intelligent terminal sends a request for enabling a one-time password function to the intelligent wearable device.

The intelligent wearable device configured with the embedded algorithm chip has a wireless or wired connection to the intelligent terminal. The wireless connection can be established by using a short-range wireless communications technology. The short-range wireless communication can include communications technologies such as Bluetooth, infrared (IrDA), wireless local area network (Wi-Fi or WLAN, mostly 802.11 series protocols), Wi-Fi Direct, ultra-wide band, ZigBee, and near field communication (NFC).

The intelligent terminal can send a request for enabling a one-time password function to the intelligent wearable device by using the established wireless or wired connection.

S112. The intelligent wearable device communicates with the embedded algorithm chip by using a micro operating system, to obtain a public key in a pair of public key and private key generated by the embedded algorithm chip by using an asymmetric encryption algorithm.

The intelligent wearable device can communicate with the embedded algorithm chip by using the micro operating system and a hardware interface. The embedded algorithm chip can generate a pair of public key and private key in advance by using an asymmetric encryption algorithm, or can generate a pair of public key and private key when the intelligent terminal in S111 sends a request for enabling a one-time password function.

The intelligent wearable device communicates with the embedded algorithm chip by using the micro operating system, and the intelligent wearable device can obtain a public key in a pair of public key and private key from the embedded algorithm chip by using the micro operating system.

S113. The intelligent wearable device sends the public key to the provisioning server by using the intelligent terminal.

The intelligent wearable device can send the obtained public key to the intelligent terminal.

S114. The provisioning server encrypts the provisioning data by using the public key and returns the encrypted provisioning data to the intelligent wearable device by using the intelligent terminal.

After obtaining the public key, the provisioning server can use the public key to encrypt the provisioning data. Further, the provisioning server can return the encrypted provisioning data to the intelligent wearable device by using the intelligent terminal.

S115. The intelligent wearable device stores the encrypted provisioning data.

After receiving the provisioning data encrypted by using the public key, the intelligent wearable device can store it. Because the intelligent wearable device does not have the private key paired with the public key, the intelligent wearable device cannot decrypt the provisioning data. Therefore, subsequent identity verification can be performed only after the paired private key in the embedded algorithm chip is used to decrypt the encrypted provisioning data.

After S114 and before S115, the embedded algorithm chip can further decrypt the encrypted provisioning data by using the paired private key to obtain decrypted provisioning data, and the embedded algorithm chip verifies the provisioning data. The embedded algorithm chip can verify the provisioning data obtained by the intelligent wearable device in the following way: The embedded algorithm chip calculates, by using a predetermined one-time password generation algorithm, a one-time password based on the provisioning data, and checks whether the length of the generated one-time password meets a predetermined value. If the length of the generated one-time password meets the predetermined value, it indicates that verification succeeds, namely, the provisioning data is correct and can be stored.

Similarly, in S110, after the intelligent wearable device configured with the embedded algorithm chip obtains the provisioning data from the provisioning server by using the connected intelligent terminal, before the intelligent wearable device stores the provisioning data, the method can further include the following: the embedded algorithm chip verifies the provisioning data obtained by the intelligent wearable device; and the intelligent wearable device stores the provisioning data obtained from the provisioning server if verification succeeds. Similarly, the embedded algorithm chip can verify the provisioning data obtained by the intelligent wearable device in the following way: the embedded algorithm chip calculates, by using a predetermined one-time password generation algorithm, a one-time password based on the provisioning data, and checks whether the length of the generated one-time password meets a predetermined value. If the length of the generated one-time password meets the predetermined value, it indicates that verification succeeds, namely, the provisioning data is correct and can be stored.

S120. The intelligent wearable device invokes the embedded algorithm chip by using the micro operating system and generates and presents a one-time password based on the provisioning data.

When identity verification is needed, for example, in a transaction process, the provisioning data stored in S110 can be used for verification.

For the unencrypted provisioning data stored in the intelligent wearable device, the embedded algorithm chip can be invoked to generate a one-time password based on the provisioning data. As described above, the provisioning data can include a seed and a server timestamp. The seed includes data. According to the data in the seed and with reference to the server timestamp, a one-time password algorithm can be used to generate a one-time password.

The embedded algorithm chip can have a predetermined one-time password generation algorithm, such as a time-based one-time password algorithm (TOTP), and an HMAC-based one-time password algorithm (HOTP). Using the HOTP as an example, the embedded algorithm chip can obtain the provisioning data stored in the intelligent wearable device, invoke the predetermined HOTP algorithm, and use the provisioning data as an input parameter of the algorithm to generate a one-time password. The embedded algorithm chip can obtain the seed and the server timestamp in the provisioning data stored in the intelligent wearable device, and invoke the predetermined HOTP algorithm. The algorithm calculates the time of the intelligent wearable device when the intelligent wearable device receives the provisioning data for the first time and time of the intelligent wearable device during current verification, which are referred to as first time and second time. It is known that usually the first time is fixed (because the time of the intelligent wearable device is fixed when the provisioning data is received for the first time). Starting from the server timestamp and in consideration of the difference between the second time and the first time, the intelligent wearable device can calculate current server time. That is, the intelligent wearable device can maintain time synchronization with the server, and can further generate a one-time password by executing the algorithm.

In this way, the server time is consistent with the time of the intelligent wearable device by using the server timestamp, and a seed in the server is consistent with the seed stored on the intelligent wearable device. Therefore, the one-time password generated by the intelligent wearable device by invoking the embedded algorithm chip by using the micro operating system is the same as a one-time password generated by using the same one-time password generation algorithm on the server. In addition, one-time passwords generated at different moments are inconsistent (possibly accurate to several seconds to minutes according to a service requirement and a network transmission delay). As such, subsequently, the server can use this principle to verify whether a one-time password generated by the intelligent wearable device is correct, to determine whether identity verification succeeds.

After generating the one-time password, the intelligent wearable device can present it. The intelligent wearable device can have a screen, and the generated one-time password can be displayed on the screen.

S130. A merchant device obtains the presented one-time password and sends the one-time password to a verification server for verification.

An acquisition device can be installed at a merchant shop, such as a scanning gun, a vertical scanner, and an embedded scanning module. These merchant devices can scan a one-time password that can be displayed on the screen of the intelligent wearable device, to obtain the one-time password.

After obtaining the one-time password, the merchant device can send it to the verification server for verification.

The verification server and the provisioning server store the same seed, and the two servers remain time synchronization. As such, after receiving a verification request sent by the merchant device, the verification server can obtain a local one-time password corresponding to a current moment, that is, a one-time password generated by the verification server itself based on the seed and the server time. The one-time password sent by the merchant device can be referred to as a first one-time password, and the one-time password generated by the verification server can be referred to as a second one-time password. As described above, the time of the intelligent wearable device is consistent with the server time by using the server timestamp. Therefore, it can be ensured that the first one-time password generated by the intelligent wearable device by invoking the embedded algorithm chip by using the micro operating system is the same as the second one-time password generated by using the same one-time password generation algorithm on the verification server. In addition, one-time passwords generated at different moments are inconsistent (possibly accurate to several seconds to minutes according to a service requirement and a network transmission delay).

As such, the verification server can determine whether identity verification succeeds by determining whether the first one-time password is consistent with the second one-time password, and if yes, verification succeeds; if not, verification fails.

S140. The merchant device receives a verification success message sent by the verification server to complete identity verification.

After verification succeeds, the verification server can return a verification success message to the merchant device. The merchant device receives the verification success message sent by the verification server to complete identity verification.

The intelligent wearable device is, for example, a smartwatch or a smart band. The smartwatch has high costs and a short standby time and is inconvenient to use. The smart band has low costs and a long standby time and is easy to use. Using the smart band as a wearable device in a payment process to implement identity verification is more promising. Certainly, the present application does not exclude an intelligent wearable device such as a smartwatch.

Figure 2:
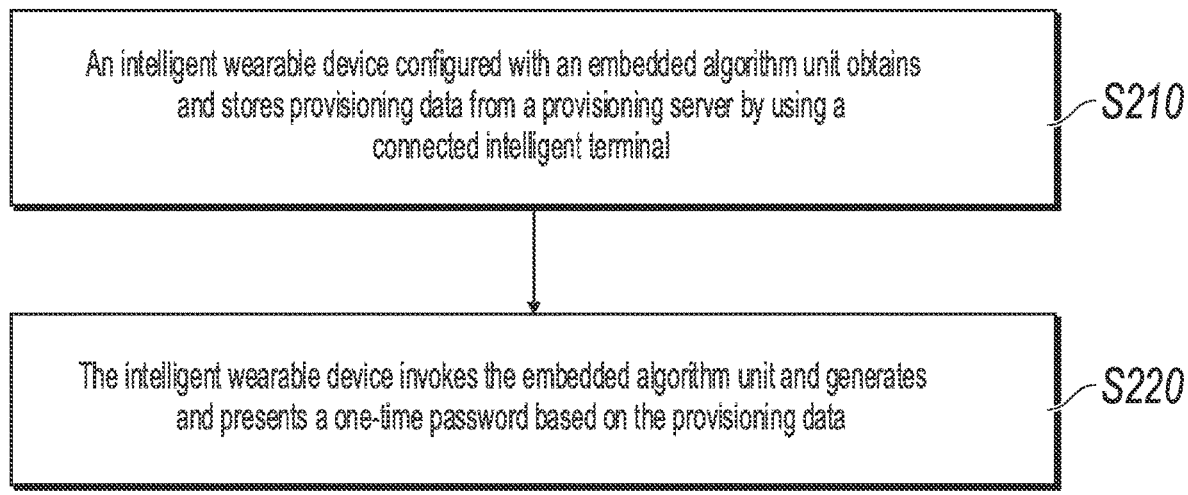
FIG. 2 is a flowchart illustrating an implementation of an identity verification method, according to the present application.

The following describes the method implementation shown in FIG. 1 from the perspective of the intelligent wearable device. As shown in FIG. 2, the method includes the following steps.

S210. An intelligent wearable device, configured with an embedded algorithm chip, obtains and stores provisioning data from a provisioning server by using a connected intelligent terminal.

S220. The intelligent wearable device invokes the embedded algorithm chip by using a micro operating system and generates and presents a one-time password based on the provisioning data.

The provisioning data includes a seed and a server timestamp.

That the intelligent wearable device, configured with the embedded algorithm chip, obtains and stores the provisioning data from the provisioning server by using the connected intelligent terminal can include the following:

S211. The intelligent wearable device receives a request sent by the intelligent terminal for enabling a one-time password function.

S212. The intelligent wearable device communicates with the embedded algorithm chip by using the micro operating system, to obtain a public key in a pair of public key and private key generated by the embedded algorithm chip by using an asymmetric encryption algorithm.

S213. The intelligent wearable device sends the public key to the provisioning server by using the intelligent terminal.

S214. The intelligent wearable device receives and stores, by using the intelligent terminal, provisioning data encrypted by using the public key and returned by the provisioning server.

After the intelligent wearable device obtains the provisioning data from the provisioning server by using the connected intelligent terminal, and before the intelligent wearable device stores the provisioning data, the method can further include the following:

S215. The intelligent wearable device sends the obtained provisioning data to the embedded algorithm chip for verification.

S216. The intelligent wearable device stores the provisioning data obtained from the server if verification succeeds.

If the provisioning data returned by the provisioning server is encrypted by using the public key, after the intelligent wearable device obtains the provisioning data encrypted using the public key from the provisioning server by using the connected intelligent terminal, and before the intelligent wearable device stores the encrypted provisioning data, the method can further include the following:

S217. The embedded algorithm chip decrypts the encrypted provisioning data by using the paired private key to obtain decrypted provisioning data.

S218. The embedded algorithm chip verifies the provisioning data.

That the embedded algorithm chip verifies the provisioning data can include the following:

The embedded algorithm chip calculates, by using a predetermined one-time password generation algorithm, a one-time password based on the provisioning data, and checks whether the length of the generated one-time password meets a predetermined value; and determines that verification succeeds if the length of the generated one-time password meets the predetermined value.

The intelligent wearable device is connected to the intelligent terminal in a wired or wireless way, and the wireless way includes a short-range wireless communications method.

The short-range wireless communications mode includes any one of the following: Bluetooth, infrared, wireless local area network, Wi-Fi Direct, ultra-wide band, ZigBee, and near field communication.

The one-time password can be generated by a one-time password generation algorithm, and the one-time password generation algorithm includes a TOTP algorithm and an HOTP algorithm.

The intelligent wearable device can present the generated one-time password by using a screen.

Figure 3:
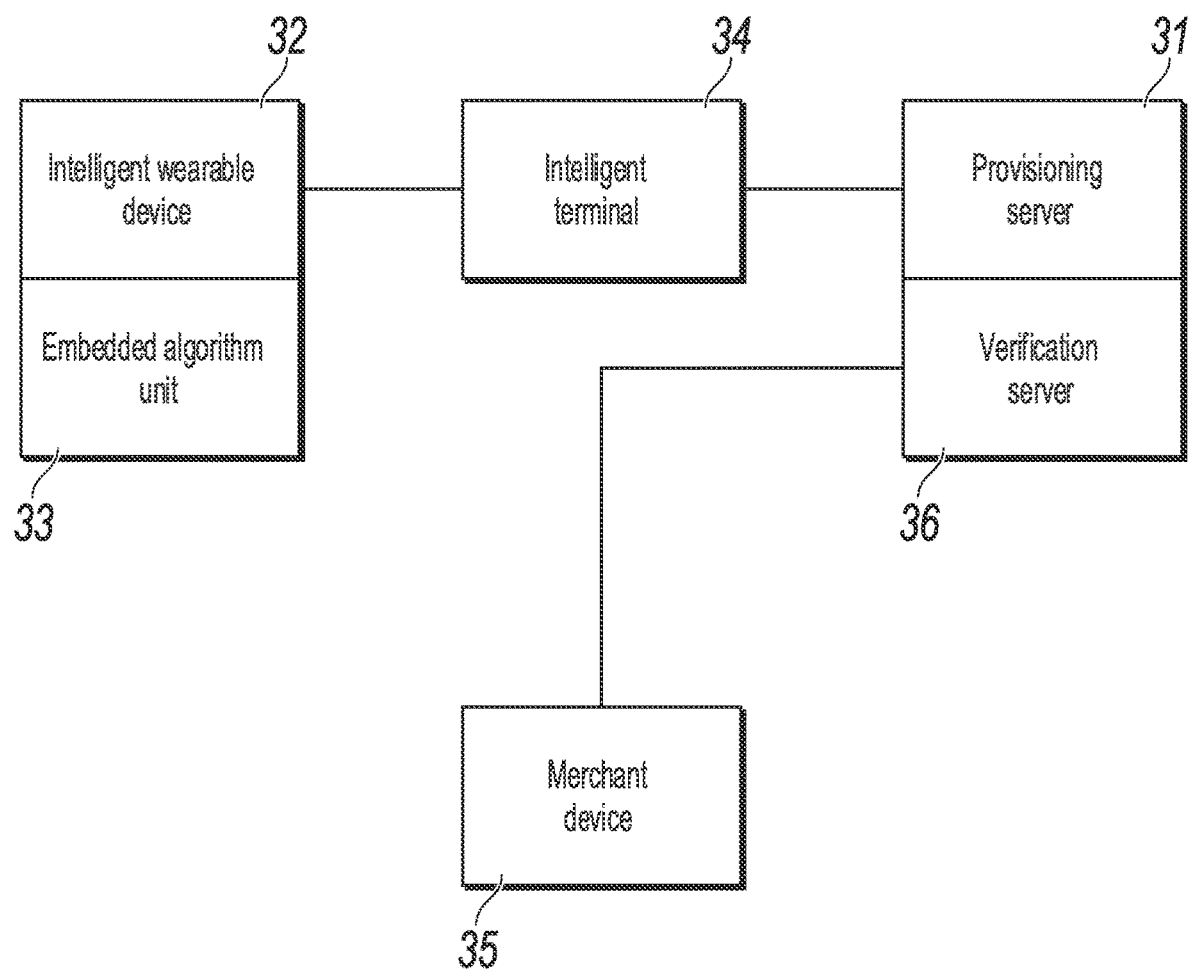
FIG. 3 is a block diagram illustrating an implementation of an identity verification system, according to the present application.

As shown in FIG. 3, the present application further provides an identity verification system implementation, including: a provisioning server 31, configured to store provisioning data; an intelligent wearable device 32, configured with an embedded algorithm chip 33, where the intelligent wearable device 32 obtains and stores the provisioning data from the provisioning server 31 by using a connected intelligent terminal 34; the embedded algorithm chip 33 has a predetermined one-time password generation algorithm; and the intelligent wearable device 32 invokes the embedded algorithm chip 33 and generates and presents a one-time password based on the provisioning data; and a merchant device 35, configured to obtain the presented one-time password and send the one-time password to a verification server 36 for verification; and further configured to complete identity verification when receiving a verification success message sent by the verification server 36.

Preferably, the provisioning server 31 and the verification server 36 are integrated into the same server.

Preferably, the provisioning data includes a seed and a server timestamp.

Preferably, the intelligent wearable device 32 includes the following: a request unit, configured to send a request for enabling a one-time password function to the intelligent wearable device; a public key acquisition unit, configured to communicate with the embedded algorithm chip, to obtain a public key in a pair of public key and private key generated by the embedded algorithm chip by using an asymmetric encryption algorithm; a public key sending unit, configured to send the public key to the provisioning server by using the intelligent terminal; a provisioning data receiving unit, configured to receive, by using the intelligent terminal, provisioning data encrypted by using the public key and returned by the provisioning server; and a storage unit, configured to store the encrypted provisioning data.

Preferably, the embedded algorithm chip 33 further includes a verification unit, configured to verify whether the provisioning data obtained by the intelligent wearable device is correct.

Preferably, the embedded algorithm chip 33 further includes a decryption unit, configured to decrypt the encrypted provisioning data by using the paired private key to obtain decrypted provisioning data.

The verification unit is configured to verify whether the decrypted provisioning data is correct.

Preferably, the verification unit calculates, by using the predetermined one-time password generation algorithm, a one-time password based on the provisioning data, and checks whether the length of the generated one-time password meets a predetermined value; and determines that verification succeeds if the length of the generated one-time password meets the predetermined value.

Preferably, the intelligent wearable device 32 is connected to the intelligent terminal 34 in a wired or wireless way, and the wireless way includes a short-range wireless communications mode.

Preferably, the short-range wireless communications mode includes any one of the following: Bluetooth, infrared, wireless local area network, Wi-Fi Direct, ultra-wide band, ZigBee, and near field communication.

Preferably, the one-time password is generated by a one-time password generation algorithm, and the one-time password generation algorithm includes a TOTP algorithm and an HOTP algorithm.

Preferably, the intelligent wearable device includes a screen, configured to present the generated one-time password.

Preferably, the merchant device 35 includes any one of a scanning gun, a vertical scanner, and an embedded scanning module.

Figure 4:
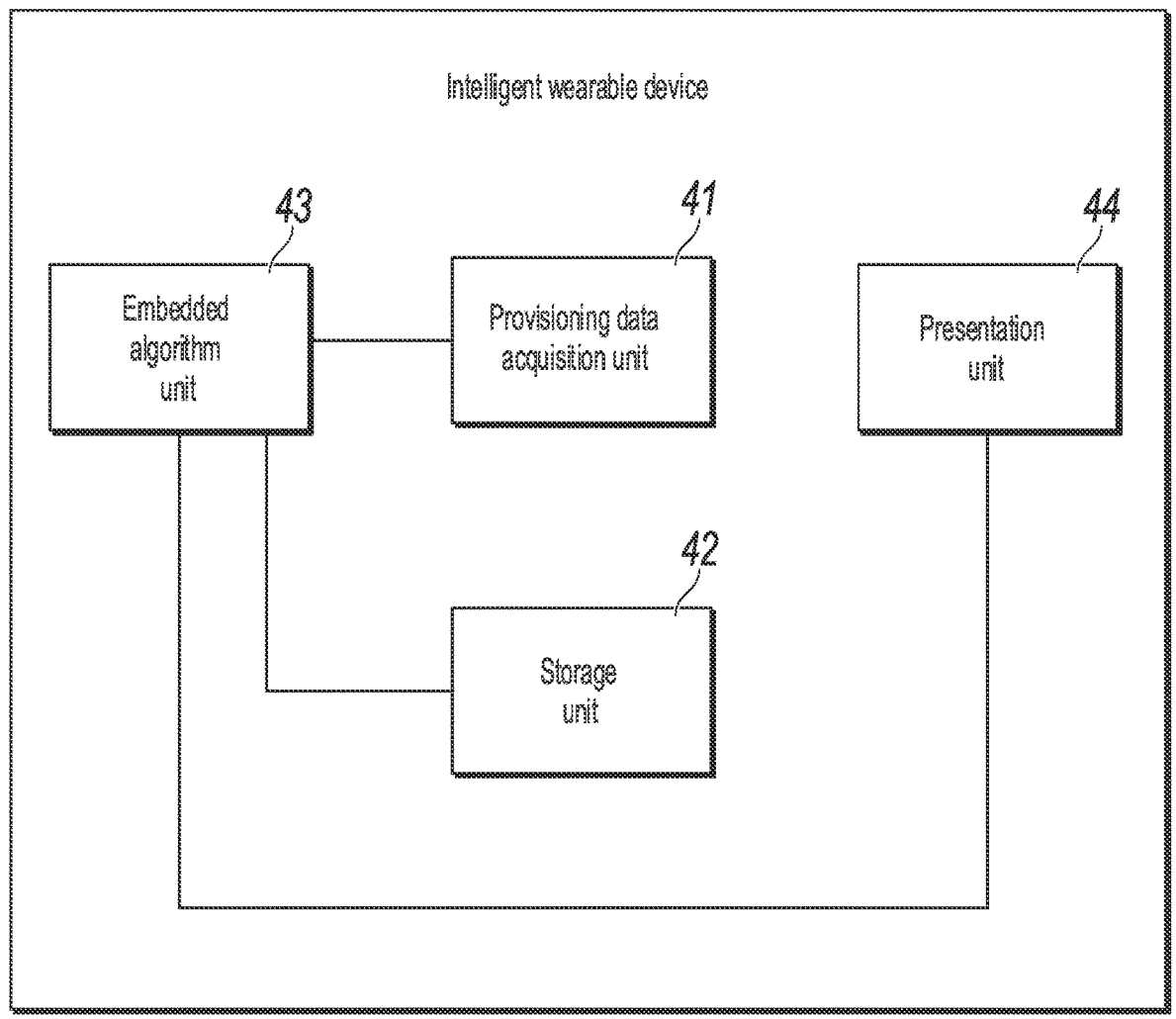
FIG. 4 is a block diagram illustrating an implementation of an intelligent wearable device, according to the present application.

As shown in FIG. 4, the present application further provides an intelligent wearable device implementation for identity verification, including: a provisioning data acquisition unit 41, configured to obtain provisioning data from a provisioning server by using a connected intelligent terminal; a storage unit 42, configured to store the obtained provisioning data; an embedded algorithm chip 43, which has a predetermined one-time password generation algorithm and generates a one-time password based on the provisioning data; and a presentation unit 44, configured to present the generated one-time password.

Preferably, the provisioning data includes a seed and a server timestamp.

Preferably, the intelligent wearable device includes: a request receiving unit, configured to receive a request sent by the intelligent terminal for enabling a one-time password function; a public key acquisition unit, configured to communicate with the embedded algorithm chip, to obtain a public key in a pair of public key and private key generated by the embedded algorithm chip by using an asymmetric encryption algorithm; a public key sending unit, configured to send the public key to the provisioning server by using the intelligent terminal; a provisioning data receiving unit, configured to receive, by using the intelligent terminal, provisioning data encrypted by using the public key and returned by the provisioning server; and a storage unit, configured to store the encrypted provisioning data.

Preferably, the embedded algorithm chip further verifies the obtained provisioning data; and the storage unit stores the provisioning data obtained from the server if verification succeeds.

Preferably, the intelligent wearable device further includes: a decryption unit, configured to decrypt the encrypted provisioning data by using the paired private key to obtain decrypted provisioning data; and the embedded algorithm chip further verifies the obtained provisioning data.

Preferably, that the embedded algorithm chip verifies the obtained provisioning data includes the following:

The embedded algorithm chip calculates, by using the predetermined one-time password generation algorithm, a one-time password based on the provisioning data, and checks whether the length of the generated one-time password meets a predetermined value; and determines that verification succeeds if the length of the generated one-time password meets the predetermined value.

Preferably, the intelligent wearable device is connected to the intelligent terminal in a wired or wireless way, and the wireless way includes a short-range wireless communications method.

Preferably, the short-range wireless communications mode includes any one of the following: Bluetooth, infrared, wireless local area network, Wi-Fi Direct, ultra-wide band, ZigBee, and near field communication.

Preferably, the one-time password is generated by a one-time password generation algorithm, and the one-time password generation algorithm includes a TOTP algorithm and an HOTP algorithm.

Preferably, the presentation unit includes a screen.

In the 1990s, it can be apparently identified whether a technology is improved in terms of hardware (for example, an improvement of circuit structure, such as a diode, a transistor, or a switch) or is improved in terms of software (an improvement of a procedure). However, as technologies develop, improvements in many current method processes can be considered as a direct improvement in a hardware circuit structure. Almost all designers obtain corresponding hardware circuit structures by programming improved method processes to hardware circuits. Therefore, it cannot be said that the improvement in a method process cannot be implemented by using a hardware entity module. For example, a programmable logic device (PLD), such as a field programmable gate array (FPGA), is such an integrated circuit whose logic function is determined by programming a device by a user. Designers "integrate" a digital system into a single PLD by means of programming without requiring a chip manufacturer to design and produce a dedicated integrated circuit chip. In addition, currently, instead of manually producing integrated circuit chips, the programming is mostly implemented by "logic compiler" software, which is similar to a software compiler used for program development and writing. Original code that exists before compiling also can be written in a specific programming language, which is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The Very-High-Speed Integrated Circuit Hardware Description Language (VHDL) and Verilog are most commonly used currently. It should also be clear to a person skilled in the art that a hardware circuit of a logic method process can be easily obtained, by performing logic programming on the method process through several earlier described hardware description languages and programming the method process to an integrated circuit.

A controller can be implemented in any appropriate way. For example, the controller can be a microprocessor or a processor and a computer readable medium storing computer readable program code (such as software or firmware) that can be executed by the microprocessor or the processor, a logic gate, a switch, an application specific integrated circuit (ASIC), a programmable logic controller, and an embedded microcontroller. Examples of the controller include but are not limited to the following microcontrollers: ARC 625D, Atmel AT91SAM, Microchip PIC18F26K20, and Silicone Labs C8051F320. A memory controller can also be implemented as a part of the control logic of a memory. A person skilled in the art also know that, in addition to implementing the controller by using the computer readable program code, logic programming of the method steps can allow the controller to implement the same function in forms of the logic gate, the switch, the application-specific integrated circuit, the programmable logic controller, and the embedded microcontroller. Therefore, such a controller can be considered as a hardware component. A device included in the controller and configured to implement various functions can be considered as a structure in the hardware component. Or, the device configured to implement various functions can even be considered as both a software module implementing the method and a structure in the hardware component.

The system, device, module or unit illustrated in the earlier described implementations can be implemented by a computer chip or an entity, or can be implemented by a product having a certain function.

For ease of description, the device is described by dividing the functions into various units. Certainly, when the present application is implemented, the functions of all units can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product implemented on one or more computer-usable storage media (including but not limited to a magnetic disk storage, a CD-ROM, an optical memory, etc.) that include computer-usable program code.

The present disclosure is described with reference to flowcharts and/or block diagrams of the method, the device (system), and the computer program product, according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the other programmable data processing device generate a device for implementing a specific function in one or more processes in the flowcharts and/or in one or more blocks in the block diagrams.

These computer program instructions can be stored in a computer readable memory that can instruct the computer or the other programmable data processing device to work in a specific method, so the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory can include a non-persistent storage, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a parallel random-access machine (PRAM), a static random access memory (SRAM), a dynamic random access memory (DRAM), another type of random access memory (RAM), a read-only memory (ROM), an electrically erasable programmable read only memory (EEPROM), a flash memory or another memory technology, a compact disc read-only memory (CD-ROM), a digital versatile disc (DVD) or other optical storage, a cassette magnetic tape, tape and disk storage or another magnetic storage device or any other non-transmission media that can be configured to store information that can be accessed by the computing device. Based on the definition in the present specification, the computer readable medium does not include a transitory computer-readable media (transitory media), for example, a modulated data signal and carrier.

It is worthwhile to further note that in the present specification, the terms "include", "comprise", or their any other variant is intended to cover a non-exclusive inclusion, so a process, a method, an article, or a device that includes a list of elements not only includes those elements but also includes other elements which are not expressly listed, or further includes elements inherent to such process, method, article, or device. An element preceded by "includes a . . ." does not, without more constraints, preclude the existence of additional identical elements in the process, method, article, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product implemented on one or more computer-usable storage media (including but not limited to a magnetic disk storage, a CD-ROM, an optical memory, etc.) that include computer-usable program code.

The present application can be described in the general context of an executable computer instruction executed by a computer, for example, a program module. Generally, the program module includes a routine, a program, an object, a component, a data structure, etc. for executing a particular task or implementing a particular abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are described in a progressive way. For same or similar parts in the implementations, reference can be made to each other. Each implementation focuses on a difference from other implementations. Particularly, a system implementation is similar to a method implementation, and therefore, is described briefly. For related parts, refer to descriptions in the method implementation.

The previous descriptions are merely implementations of the present application, and are not intended to limit the present application. For a person skilled in the art, the present application can have various modifications and changes. Any modification, equivalent replacement, or improvement made without departing from the spirit and principle of the present application shall fall within the scope of the claims of the present application.

Figure 5:
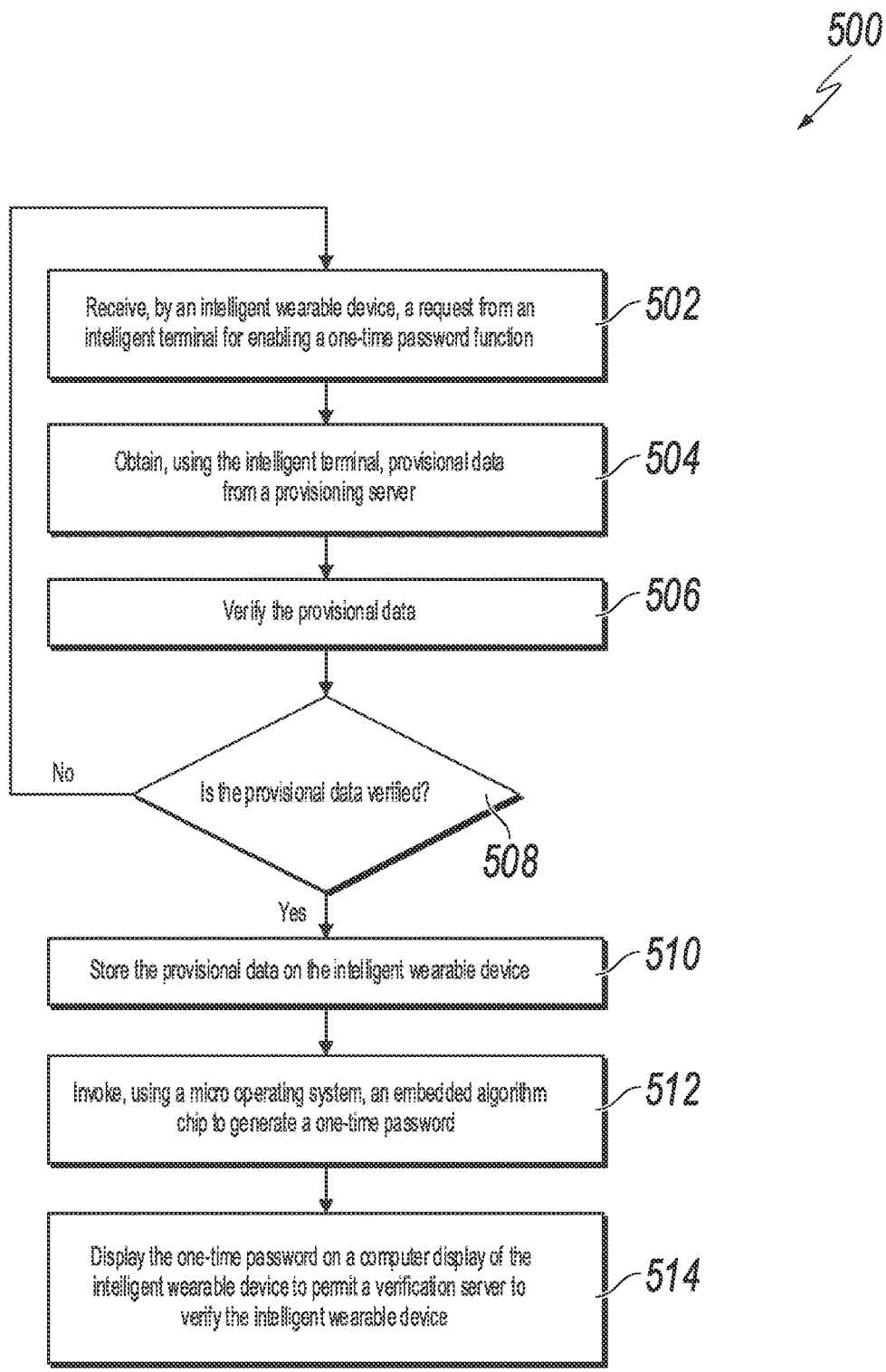
FIG. 5 is a flowchart illustrating an example of a computer-implemented method for identity verification using an intelligent wearable device, according to an implementation of the present disclosure.

FIG. 5 is a flowchart illustrating an example of a computer-implemented method 500 for identity verification using an intelligent wearable device, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, a request is received from an intelligent terminal for enabling a one-time password function by an intelligent wearable device, and the intelligent wearable device is configured with an embedded algorithm chip. In some implementations, the intelligent wearable device and the intelligent terminal are wired or wirelessly connected, and the wireless connection includes a short-distance wireless communication mode. From 502, method 500 proceeds to 504.

At 504, provisional data is obtained from a provisioning server obtaining using the intelligent terminal. In some implementations, the provisional data includes seed data and a server timestamp. From 504, method 500 proceeds to 506.

At 506, the provisional data is verified. From 506, method 500 proceeds to 508.

At 508, a determination is made as to whether the provisional data is verified. If it is determined that the provisional data is verified. Method 500 proceeds to 510. Otherwise, if it is determined that the provisional data is not verified, method 500 proceeds back to 502.

At 510, the provisional data is stored on the intelligent wearable device. From 510, method 500 proceeds to 512.

At 512, the embedded algorithm chip is invoked to generate a one-time password using a micro operating system. From 512, method 500 proceeds to 514.

At 514, the one-time password is displayed on a computer display of the intelligent wearable device, and the one-time password is configured to permit a verification server to verify the intelligent wearable device. In some implementations, the one-time password is generated using a one-time password algorithm and based on the provisional data.

In some implementations, the method 500 further includes using the verification server to verify the one-time password displayed on the computer display of the intelligent wearable device. In such implementations, verifying the one-time password includes receiving, at the verification server, the one-time password from a merchant device, and the merchant device obtains the one-time password by scanning the one-time password displayed on the computer display of the intelligent wearable device, obtaining a local one-time password corresponding to a current moment, and verifying the one-time password by determining whether the one-time password is consistent with the local one-time password.

In some implementations, the method 500 further includes prior to storing the provisional data, obtaining, using a micro operation system, a public key of public key and private key pair from the embedded algorithm chip, wherein the public key and private key pair are generated by the embedded algorithm chip using an asymmetric encryption algorithm, sending, using the intelligent terminal, the public key to a provisioning server, obtaining the provisional data from the provisioning server, and the provisional data is encrypted by the provisioning server using the public key, and verifying, using the embedded algorithm chip, the provisional data.

In some implementations, the method 500 further includes using the embedded algorithm chip to verify the provisional data, wherein verifying the provisional data. In such implementations, verifying the provisional data includes decrypting, using the private key, the provisional data, generating, using a predetermined one-time password generation algorithm and based on the provisional data, a one-time password, determining whether a length of the generated one-time password meets a predetermined value, and if the length of the generated one-time password meets the predetermined value, indicating that the provisional data is verified.

In some implementations, the method 500 further includes prior to storing the provisional data, obtaining, using a micro operation system, a public key of public key and private key pair from the embedded algorithm chip, wherein the public key and private key pair are generated by the embedded algorithm chip using an asymmetric encryption algorithm, sending, using the intelligent terminal, the public key to a provisioning server, obtaining the provisional data from the provisioning server, wherein the provisional data is encrypted by the provisioning server using the public key, and verifying, using the embedded algorithm chip, the provisional data.

In some implementations, the method 500 further includes using the embedded algorithm chip to verify the provisional data. In such implementations, verifying the provisional data includes decrypting, using the private key, the provisional data, generating, using a predetermined one-time password generation algorithm and based on the provisional data, a one-time password, determining whether a length of the generated one-time password meets a predetermined value, and if the length of the generated one-time password meets the predetermined value, indicating that the provisional data is verified. After 514, method 500 can stop.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   receiving, by an intelligent wearable device that includes an embedded algorithm chip that implements a one-time password algorithm, a request from an intelligent terminal for enabling a one-time password function;
   after receiving the request from the intelligent terminal, storing, by the intelligent wearable device, provisional data that has been successfully verified by the intelligent terminal;
   invoking, using a micro operating system of the intelligent wearable device, the embedded algorithm chip to generate, based on the one-time password algorithm and the provisional data, a one-time password;
   providing, for display by a computer display of the intelligent wearable device, the one-time password; and
   prior to storing the provisional data:
      obtaining, using the micro operating system, a public key of public key and private key pair from the embedded algorithm chip, wherein the public key and private key pair are generated by the embedded algorithm chip using an asymmetric encryption algorithm;
      sending, using the intelligent terminal, the public key to a provisioning server; obtaining the provisional data from the provisioning server, wherein the provisional data is encrypted by the provisioning server using the public key; and
      verifying, using the embedded algorithm chip, the provisional data.

2. The computer-implemented method of claim 1, wherein the provisional data includes seed data and a server timestamp.

3. The computer-implemented method of claim 1, further comprising:
   verifying, using a verification server, the one-time password displayed on the computer display of the intelligent wearable device, wherein verifying the one-time password comprises:
      receiving, at the verification server, the one-time password from a merchant device, wherein the merchant device obtains the one-time password by scanning the one-time password displayed on the computer display of the intelligent wearable device;
      obtaining a local one-time password corresponding to a current moment; and
      verifying the one-time password by determining whether the one-time password is consistent with the local one-time password.

4. The computer-implemented method of claim 1, further comprising:
   verifying, using the embedded algorithm chip, the provisional data, wherein verifying the provisional data comprises:
      decrypting, using the private key, the provisional data;
      generating, using a predetermined one-time password generation algorithm and based on the provisional data, a one-time password;
      determining whether a length of the generated one-time password meets a predetermined value; and
      if the length of the generated one-time password meets the predetermined value, indicating that the provisional data is verified.

5. The computer-implemented method of claim 1, wherein the intelligent wearable device and the intelligent terminal are wired or wirelessly connected, and wherein the wireless connection includes a short-distance wireless communication mode.

6. A non-transitory, computer-readable medium storing one or more instructions executable by a computer system to perform operations comprising:
   receiving, by an intelligent wearable device that includes an embedded algorithm chip that implements a one-time password algorithm, a request from an intelligent terminal for enabling a one-time password function;
   after receiving the request from the intelligent terminal, storing, by the intelligent wearable device, provisional data that has been successfully verified by the intelligent terminal;
   invoking, using a micro operating system of the intelligent wearable device, the embedded algorithm chip to generate, based on the one-time password algorithm and the provisional data, a one-time password;
   providing, for display by a computer display of the intelligent wearable device, the one-time password; and
   prior to storing the provisional data:
      obtaining, using the micro operating system, a public key of public key and private key pair from the embedded algorithm chip, wherein the public key and private key pair are generated by the embedded algorithm chip using an asymmetric encryption algorithm;
      sending, using the intelligent terminal, the public key to a provisioning server; obtaining the provisional data from the provisioning server, wherein the provisional data is encrypted by the provisioning server using the public key; and
      verifying, using the embedded algorithm chip, the provisional data.

7. The non-transitory, computer-readable medium of claim 6, wherein the provisional data includes seed data and a server timestamp.

8. The non-transitory, computer-readable medium of claim 6, further comprising:
verifying, using a verification server, the one-time password displayed on the computer display of the intelligent wearable device, wherein verifying the one-time password comprises:
receiving, at the verification server, the one-time password from a merchant device, wherein the merchant device obtains the one-time password by scanning the one-time password displayed on the computer display of the intelligent wearable device;
obtaining a local one-time password corresponding to a current moment; and
verifying the one-time password by determining whether the one-time password is consistent with the local one-time password.

9. The non-transitory, computer-readable medium of claim 6, further comprising:
verifying, using the embedded algorithm chip, the provisional data, wherein verifying the provisional data comprises:
decrypting, using the private key, the provisional data;
generating, using a predetermined one-time password generation algorithm and based on the provisional data, a one-time password;
determining whether a length of the generated one-time password meets a predetermined value; and
if the length of the generated one-time password meets the predetermined value, indicating that the provisional data is verified.

10. The non-transitory, computer-readable medium of claim 6, wherein the intelligent wearable device and the intelligent terminal are wired or wirelessly connected, and wherein the wireless connection includes a short-distance wireless communication mode.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by an intelligent wearable device that includes an embedded algorithm chip that implements a one-time password algorithm, a request from an intelligent terminal for enabling a one-time password function;
after receiving the request from the intelligent terminal, storing, by the intelligent wearable device, provisional data that has been successfully verified by the intelligent terminal;
invoking, using a micro operating system of the intelligent wearable device, the embedded algorithm chip to generate, based on the one-time password algorithm and the provisional data, a one-time password;
providing, for display by a computer display of the intelligent wearable device, the one-time password; and
prior to storing the provisional data:
obtaining, using the micro operating system, a public key of public key and private key pair from the embedded algorithm chip, wherein the public key and private key pair are generated by the embedded algorithm chip using an asymmetric encryption algorithm;
sending, using the intelligent terminal, the public key to a provisioning server; obtaining the provisional data from the provisioning server, wherein the provisional data is encrypted by the provisioning server using the public key; and
verifying, using the embedded algorithm chip, the provisional data.

12. The computer-implemented system of claim 11, wherein the provisional data includes seed data and a server timestamp.

13. The computer-implemented system of claim 11, further comprising:
verifying, using a verification server, the one-time password displayed on the computer display of the intelligent wearable device, wherein verifying the one-time password comprises:
receiving, at the verification server, the one-time password from a merchant device, wherein the merchant device obtains the one-time password by scanning the one-time password displayed on the computer display of the intelligent wearable device;
obtaining a local one-time password corresponding to a current moment; and
verifying the one-time password by determining whether the one-time password is consistent with the local one-time password.

14. The computer-implemented system of claim 11, further comprising:
verifying, using the embedded algorithm chip, the provisional data, wherein verifying the provisional data comprises:
decrypting, using the private key, the provisional data;
generating, using a predetermined one-time password generation algorithm and based on the provisional data, a one-time password;
determining whether a length of the generated one-time password meets a predetermined value; and
if the length of the generated one-time password meets the predetermined value, indicating that the provisional data is verified.

* * * * *